United States Patent
Yudanov et al.

(10) Patent No.: US 12,333,304 B2
(45) Date of Patent: **\*Jun. 17, 2025**

(54) METHODS FOR PERFORMING PROCESSING-IN-MEMORY OPERATIONS, AND RELATED SYSTEMS

(71) Applicant: Micron Technology, Inc., Boise, ID (US)

(72) Inventors: Dmitri Yudanov, Cordova, CA (US); Sean S. Eilert, Penryn, CA (US); Sivagnanam Parthasarathy, Carlsbad, CA (US); Shivasankar Gunasekaran, Folsom, CA (US); Ameen D. Akel, Rancho Cordova, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/582,520

(22) Filed: Feb. 20, 2024

(65) Prior Publication Data

US 2024/0192953 A1 Jun. 13, 2024

Related U.S. Application Data

(63) Continuation of application No. 16/841,222, filed on Apr. 6, 2020, now Pat. No. 11,934,824.

(Continued)

(51) Int. Cl.
*G06F 9/30* (2018.01)
*G06F 7/544* (2006.01)

(52) U.S. Cl.
CPC .......... *G06F 9/3001* (2013.01); *G06F 7/5443* (2013.01); *G06F 9/30032* (2013.01); *G06F 9/30043* (2013.01)

(58) Field of Classification Search
CPC .................................................... G06F 7/5443
See application file for complete search history.

(56) References Cited

U.S. PATENT DOCUMENTS

| 6,484,231 | B1 | 11/2002 | Kim | |
|---|---|---|---|---|
| 8,762,445 | B2* | 6/2014 | Duncan | G06F 3/147 |
| | | | | 709/201 |

(Continued)

FOREIGN PATENT DOCUMENTS

| CN | 101331554 A | 12/2008 |
|---|---|---|
| CN | 101789234 A | 7/2010 |

(Continued)

OTHER PUBLICATIONS

Chinese First Office Action for Chinese Application No. 202080061754.1, dated Jun. 28, 2024, 20 pages with translation.

(Continued)

*Primary Examiner* — Michael D. Yaary
(74) *Attorney, Agent, or Firm* — TraskBritt

(57) ABSTRACT

Methods, apparatuses, and systems for in-or near-memory processing are described. Strings of bits (e.g., vectors) may be fetched and processed in logic of a memory device without involving a separate processing unit. Operations (e.g., arithmetic operations) may be performed on numbers stored in a bit-parallel way during a single sequence of clock cycles. Arithmetic may thus be performed in a single pass as numbers are bits of two or more strings of bits are fetched and without intermediate storage of the numbers. Vectors may be fetched (e.g., identified, transmitted, received) from one or more bit lines. Registers of a memory array may be used to write (e.g., store or temporarily store) results or ancillary bits (e.g., carry bits or carry flags) that facilitate arithmetic operations. Circuitry near, adjacent, or under the (Continued)

memory array may employ XOR or AND (or other) logic to fetch, organize, or operate on the data.

20 Claims, 9 Drawing Sheets

Related U.S. Application Data

(60) Provisional application No. 62/896,228, filed on Sep. 5, 2019.

(56) References Cited

U.S. PATENT DOCUMENTS

| | | | |
|---|---|---|---|
| 9,430,735 | B1 | 8/2016 | Vali et al. |
| 9,496,023 | B2 | 11/2016 | Wheeler et al. |
| 9,704,540 | B2 | 7/2017 | Manning et al. |
| 10,074,407 | B2 | 9/2018 | Manning et al. |
| 10,249,350 | B2 | 4/2019 | Manning et al. |
| 10,416,927 | B2 | 9/2019 | Lea et al. |
| 10,453,499 | B2 | 10/2019 | Manning et al. |
| 10,490,257 | B2 | 11/2019 | Wheeler et al. |
| 10,497,442 | B1 | 12/2019 | Kumar et al. |
| 10,635,398 | B2 | 4/2020 | Lin et al. |
| 10,642,922 | B2 | 5/2020 | Knag et al. |
| 11,537,861 | B2 | 12/2022 | Yudanov et al. |
| 2011/0040821 | A1 | 2/2011 | Eichenberger et al. |
| 2011/0055517 | A1 | 3/2011 | Eichenberger et al. |
| 2011/0153707 | A1 | 6/2011 | Ginzburg et al. |
| 2012/0182799 | A1 | 7/2012 | Bauer |
| 2013/0173888 | A1 | 7/2013 | Hansen et al. |
| 2015/0006810 | A1 | 1/2015 | Busta et al. |
| 2015/0357024 | A1 | 12/2015 | Hush et al. |
| 2016/0004508 | A1 | 1/2016 | Elmer |
| 2016/0064045 | A1 | 3/2016 | La Fratta |
| 2016/0099073 | A1 | 4/2016 | Cernea |
| 2016/0321031 | A1 | 11/2016 | Hancock |
| 2017/0277659 | A1 | 9/2017 | Akerib et al. |
| 2017/0345481 | A1 | 11/2017 | Hush |
| 2018/0129474 | A1 | 5/2018 | Ahmed |
| 2018/0210994 | A1 | 7/2018 | Wuu et al. |
| 2018/0246855 | A1 | 8/2018 | Redfern et al. |
| 2018/0286468 | A1 | 10/2018 | Willcock |
| 2019/0019538 | A1 | 1/2019 | Li et al. |
| 2019/0035449 | A1 | 1/2019 | Saida et al. |
| 2019/0042199 | A1 | 2/2019 | Sumbul et al. |
| 2019/0043560 | A1 | 2/2019 | Sumbul et al. |
| 2019/0080230 | A1 | 3/2019 | Hatcher et al. |
| 2019/0102170 | A1 | 4/2019 | Chen et al. |
| 2019/0102358 | A1 | 4/2019 | Asnaashari et al. |
| 2019/0221243 | A1 | 7/2019 | Manning et al. |
| 2019/0228301 | A1 | 7/2019 | Thorson et al. |
| 2020/0020393 | A1 | 1/2020 | Al-Shamma |
| 2020/0035305 | A1 | 1/2020 | Choi et al. |
| 2020/0082871 | A1 | 3/2020 | Wheeler et al. |
| 2020/0210369 | A1 | 7/2020 | Song |
| 2020/0342938 | A1 | 10/2020 | Tran et al. |
| 2020/0357459 | A1 | 11/2020 | Zidan et al. |
| 2021/0104551 | A1 | 4/2021 | Lin et al. |
| 2021/0110235 | A1 | 4/2021 | Hoang et al. |

FOREIGN PATENT DOCUMENTS

| | | |
|---|---|---|
| CN | 105027212 A | 11/2015 |
| CN | 105556607 A | 5/2016 |
| CN | 106445468 A | 2/2017 |
| CN | 106485321 A | 3/2017 |
| CN | 108595239 A | 9/2018 |
| CN | 109427384 A | 3/2019 |
| EP | 0290111 A2 | 11/1988 |
| KR | 10-2014-0033937 A | 3/2014 |
| KR | 10-2017-0138143 A | 12/2017 |
| KR | 10-2018-0042111 A | 4/2018 |
| KR | 10-2019-0051766 A | 5/2019 |
| WO | 2018/154268 A1 | 8/2018 |

OTHER PUBLICATIONS

Korean Notice of Reasons for Rejection for Korean Application No. 10-2022-7010454, dated Jun. 11, 2024, 16 pages with English translation.

Chiu et al, "A Binarized Neural Network Accelerator with Differential Crosspoint Memristor Array for Energy-Efficient MAC Operations," 2019 IEEE International Symposium on Circuits and Systems (ISCAS), 2019, pp. 1-5, doi: 10.1109/ISCAS.2019.8702128. (Year: 2019).

European Extended Search Report and Opinion for European Application No. 20861928.8, dated Jun. 27, 2023, 8 pages.

International Search Report for Application No. PCT/US2020/070418, mailed Nov. 27, 2020, 5 pages.

International Search Report for Application No. PCT/US2020/070450, mailed Nov. 25, 2020, 3 pages.

Patterson et al., "Computer Organization and Design: The Hardware/Software Interface", Fifth Edition, Chapter 3.2 pp. 178-182, 2014. Retrieved from <https://ict.iitk.ac.in/wp-content/uploads/CS422-Computer-Architecture-ComputerOrganizationAndDesign5thEdition2014.pdf> (Year: 2014).

Written Opinion of the International Searching Authority for Application No. PCT/US2020/070418, mailed Nov. 27, 2020, 7 pages.

Written Opinion of the International Searching Authority for Application No. PCT/US2020/070450, mailed Nov. 25, 2020, 5 pages.

Yudanov et al., U.S. Appl. No. 16/717,890 titled Methods for Performing Processing-in-Memory Operations on Serially Allocated Data, and Related Memory Devices and Systems filed Dec. 17, 2019.

Chinese Notice of Allowance and Search Report for Chinese Application No. 202080061754.1, dated Nov. 6, 2024, 4 pages.

Zhang et al., "Design of High Performance Memory Controller Based on SOC", Microelectronics & Computer, No. 5, (2015), 5 pages, English Translation of Abstract.

* cited by examiner a×b b   1001
a   1101

M   XXX1001
    XX0000X
    X1001XX
    1001XXX $C_{in}$  0010000

$$XXX0000 \leftarrow b'(1)$$
$$XX1101X \leftarrow b'(2)$$
$$X0000XX \leftarrow b'(3)$$
$$1101XXX \leftarrow b'(i)$$
$$\overline{\phantom{XXXXXXX}}$$
$$1000010 \leftarrow C[i]$$

FIG. 5A

$$XXX1110 \leftarrow b''(1)$$
$$XX1110X \leftarrow b''(2)$$
$$X0000XX \leftarrow b''(3)$$
$$0000XXX \leftarrow b''(i)$$
$$\overline{\phantom{XXXXXXX}}$$
$$0101010 \leftarrow C[i+1]\mathbf{6}$$

FIG. 5B

METHODS FOR PERFORMING PROCESSING-IN-MEMORY OPERATIONS, AND RELATED SYSTEMS

CROSS-REFERENCE TO RELATED APPLICATION

This application is a continuation of U.S. patent application Ser. No. 16/841,222, filed Apr. 6, 2020, now U.S. Pat. No. 11,934,824, issued Mar. 19, 2024, which claims the benefit under 35 U.S.C. § 119 (e) of U.S. Provisional Patent Application Ser. No. 62/896,228, filed Sep. 5, 2019, the disclosure of each of which is hereby incorporated herein in its entirety by this reference.

TECHNICAL FIELD

Embodiments of the disclosure relate to processing in memory and, more specifically, to processing-in-memory fused-multiply-add operations. Yet more specifically, some embodiments relate to methods for performing fused-multiply-add operations within a processing-in-memory capable memory device, and related memory devices, memory systems, and electronic systems.

BACKGROUND

Memory devices are typically provided as internal, semiconductor-based, integrated circuits in computers or other electronic systems. There are many different types of memory including volatile and non-volatile memory. Volatile memory, which may retrieve stored information after being power cycled, may include, among others, flash memory including NAND or NOR flash memories. Volatile memory may require power to maintain its data (e.g., host data, error data, etc.) and includes random access memory (RAM), dynamic random access memory (DRAM), static random access memory (SRAM), synchronous dynamic random access memory (SDRAM), content addressable memory (CAM), and thyristor random access memory (TRAM), among others.

Electronic systems often include a number of processing resources (e.g., one or more processors), which may retrieve and execute instructions and store the results of the executed instructions to a suitable location. A processor may include a number of functional units such as arithmetic logic unit (ALU) circuitry, floating point unit (FPU) circuitry, and a combinatorial logic block, for example, which may be used to execute instructions by performing an operation on data (e.g., one or more operands). As used herein, an operation may include, for example, a Boolean operation, such as AND, OR, NOT, NAND, NOR, and XOR, and/or other operations (e.g., invert, shift, arithmetic, statistics, among many other possible operations). For example, functional unit circuitry may be used to perform the arithmetic operations, such as addition, subtraction, multiplication, and division on operands, via a number of operations.

A number of components in an electronic system may be involved in providing instructions to the functional unit circuitry for execution. The instructions may be executed, for instance, by a processing resource such as a controller and/or host processor. Data (e.g., the data on which the instructions may be executed) may be stored in a memory array that is accessible by the functional unit circuitry. The instructions and/or data may be retrieved from the memory array and sequenced and/or buffered before the functional unit circuitry begins to execute instructions on the data.

BRIEF DESCRIPTION OF THE DRAWINGS

FIG. 3 illustrates a number of example bit vectors, an intermediate matrix resulting from multiplication of the bit vectors, and an output bit vector, generated according to various embodiments of the present disclosure.

FIGS. 5A and 5B illustrate various scaled rows and output rows generated via one or more embodiments of the present disclosure.

DETAILED DESCRIPTION

Figure 1:
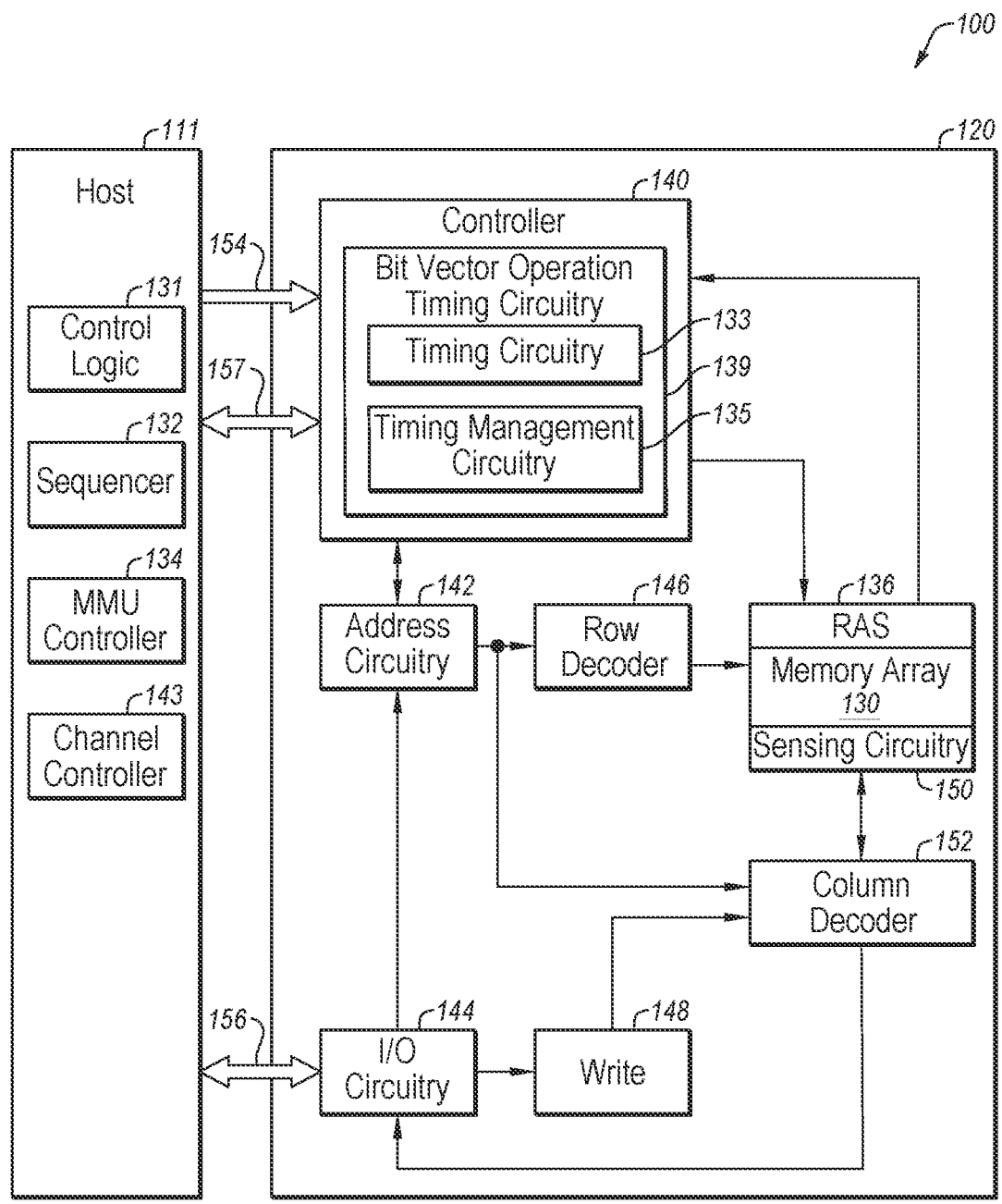
FIG. 1 is a block diagram of a system including a memory device, in accordance with a number of embodiments of the present disclosure.

Fused-multiply-add (FMA) and matrix multiplication operations are used in many applications, such as in machine learning, image processing, artificial intelligence, system modeling (e.g., electrical systems, mechanical systems, etc.), and many others. The logic of these operations may be relatively simple (e.g., multiply and accumulate). However, conventional computer-based computations may involve processor and memory intensive operations, including transferring large amounts of data between compute cores and memory arrays.

In many instances, processing resources (e.g., processor and associated functional unit circuitry) may be external to the memory array, and data is accessed via a bus between the processing resources and the memory array to execute a set of instructions. Processing performance may be improved in a processor-in-memory (PIM) device, in which a processor may be implemented internally and/or near to a memory (e.g., directly on a same chip as the memory array). A PIM device may save time and/or conserve power by reducing and eliminating external communications.

Various embodiments of the disclosure relate to processing-in-memory (PIM) operations, and more specifically to performing PIM fused-multiply-add (FMA) operations, wherein data to be used in a computation may be reused for a number of computations. Stated another way, rather than loading data each time the data is to be used in a computation, the data may be read (loaded) and used in multiple computations (e.g., across a number of bit lines). More specifically, for example, according to some embodiments, an operand may be loaded into a sequencer of a memory system including a memory device. Further, a number of groups of bits of one or more rows of a memory array of the memory device may be loaded (e.g., via a number of bit lines of the memory array) into a sense amplifier array of the memory device. Also, each bit of the number of groups of bits of the one or more rows may be multiplied by the operand to generate a scaled row. A multiplication process may be repeated for one or more additional operands to generate one or more additional scaled rows. Further, a row of an output matrix may be generated based on a number of scaled rows. Accordingly, and as described more fully herein, an operand may be reused across a number of bits (e.g., all bits of a row of a matrix) to generate one or more scaled rows. Thus, in comparison to conventional systems and methods, a number of memory loads and memory stores may be reduced, which may reduce latency and increase efficiency of PIM operations.

As used herein, a processing-in memory (PIM) capable device refers to a memory device capable of performing logical and arithmetic operations on data stored in an array of memory cells using a processing resource internal to the memory device (e.g., without transferring the data to an external processing resource such as a host processor). As an example, a PIM capable device may include a memory array coupled to sensing circuitry comprising sensing components operable as 1-bit processing elements (e.g., to perform parallel processing on a per column basis). A PIM capable device may also perform memory operations in addition to logical operations performed "in memory," which may be referred to as "bit vector operations." As an example, a PIM capable device may include a dynamic random access memory (DRAM) array with memory operations including memory access operations such as reads (e.g., loads) and writes (e.g., stores), among other operations that do not involve operating on the data. For example, a PIM capable device may operate a DRAM array as a "normal" DRAM array and/or as a PIM DRAM array depending on a type of program being executed (e.g., by a host), which may include both memory operations and bit vector operations. For example, bit vector operations may include logical operations such as Boolean operations (e.g., AND, OR, XOR, etc.) and transfer operations such as shifting data values in the array and inverting data values, for example. Arithmetic operations performed by a PIM device may be enabled by logical operations. For example, a single-bit addition may be enabled by a set of operations: 0+0={0–sum, 0–carry}, 0+1={1–sum, 0–carry}, 1+0={1–sum, 0–carry}, 1+1={0–sum, 1–carry}. Thus, a sum may be a XOR operation, and a carry may be an AND operation.

As used herein, a PIM operation may refer to various operations associated with performing in memory processing utilizing a PIM capable device. An operation hierarchy can be used to define a PIM operation. For example, a first (e.g., lowest) level in the operation hierarchy can include bit vector operations (e.g., fundamental logical operations, which may be referred to as "primitive" operations). A next (e.g., middle) level in the hierarchy can include composite operations, which comprise multiple bit vector operations. For instance, composite operations can include mathematical operations such as adds, multiplies, etc., which can comprise a number of logical ANDs, ORs, XORs, shifts, etc. A third (e.g., highest) level in the hierarchy can include control flow operations (e.g., looping, branching, etc.) associated with executing a program whose execution involves performing processing using a PIM capable device.

As described in more detail herein, PIM operations may be executed by various components within a system comprising a PIM capable device. For instance, a first PIM control component (e.g., control logic, which may be referred to as a "scalar unit"), which may be located on a host, may execute control flow operations and provide composite operations to a second PIM control component (e.g., a sequencer), which may also be located on the host or on the PIM capable device. In a number of embodiments, the second control component may provide low level bit vector operations to a PIM control component located on the PIM capable device (e.g., bit vector timing circuitry), which may execute the bit vector operations in memory and return results to the host. As described further herein, an interface used to transfer PIM operations between a PIM capable device and the host may include a channel, which may include a bus separate from a typical memory interface, such as a DDR interface, used to transfer commands, addresses, and/or data. Also, in a number of embodiments, providing PIM control components on the host may provide benefits such as allowing a PIM program to use virtual addressing (e.g., by resolving virtual addresses on the host since the PIM capable device may operate only on physical addresses).

Techniques described herein may also be applicable to processing in storage (e.g., processing in NAND or NOR Flash, 3D XPOINT™, or the like). PIM may also be referred to as compute in memory or compute in storage. In other words, this disclosure contemplates processing or computation in devices often associated with storing or organizing data such as memory or storage, which, in some architectures, are distinct from a CPU, GPU, GPGPU, FPGA, ASIC, or the like.

FIG. 1 is a block diagram of a system 100 including a memory device 120, in accordance with a number of embodiments of the present disclosure. Memory device 120, which may also be referred to herein as a "PIM capable device" or "PIM capable memory device," may include any suitable memory device. For example, memory device 120 may include volatile memory (e.g., RAM, DRAM, etc.) and/or non-volatile memory (e.g., flash memory, a crosspoint memory device such as a 3D crosspoint memory device, etc.). Memory device 120 may include a memory array 130 (i.e., including memory cells) coupled to sensing circuitry, as described in more detail below. According to some embodiments, memory device 120 may include multiple memory arrays 130 organized in banks, ranks, decks, plains, or some other form.

System 100 further includes a host 111 coupled to memory device 120. Host 111 may include a host system such as a personal laptop computer, a desktop computer, a digital camera, a smart phone, or a memory card reader, among various other types of hosts. Host 111 may include a system motherboard and/or backplane and may include a number of processing resources (e.g., one or more processors, microprocessors, or some other type of controlling circuitry). System 100 may include separate integrated circuits or both host 111 and memory device 120 may be part of the same integrated circuit (e.g., on a same chip). System 100 may include, for instance, a server system and/or a high-performance computing (HPC) system and/or a portion thereof.

Host 111 may include various components including PIM control components (e.g., control logic 131, a sequencer 132), a channel controller 143, and a memory management unit (MMU) controller 134. Control logic 131 may be configured to execute control flow commands associated with an executing PIM program and to provide composite commands to sequencer 132. Control logic 131 may be, or may include, a RISC type controller configured to generate and issue an extensible set of composite operation PIM commands that includes commands different from DDR commands sent to sequencer 132. In some embodiments, control logic 131 may be configured to issue composite operation commands to cause bit vector operations to be performed on memory device 120. In some embodiments, the composite operation commands may be transferred from control logic 131 to memory device 120 (e.g., via sequencer 132 and channel bus 157).

Control logic 131 may, in some embodiments, decode microcode instructions into function calls, which may be microcode function calls, associated with performing a bit vector operation, implemented by sequencer 132. The microcode function calls may be the operations that sequencer 132 receives and/or executes to cause memory device 120 to perform particular bit vector operations using the sensing circuitry, such as sensing circuitry 150.

As shown in FIG. 1, sequencer 132, control logic 131 and MMU controller 134 are located on host 111, which may allow for control logic 131 and/or MMU controller 134 to perform memory access using virtual addresses and perform virtual to physical address translation prior to transferring instructions to memory device 120. In some embodiments, sequencer 132 and/or control logic 131 are implemented in memory device 120. In such cases, the amount of communication between host 111 and memory device 120 is reduced, which may improve performance and/or reduce power consumption of a PIM device. Virtual to physical address translation, in this case, may still be performed by MMU controller 134. However, such translation may be trivial for ease of this operation and if data that is used in operation is pre-allocated in fixed pattern. For example, the pre-allocated data in physical address space may be a simple contiguous piece of 'pinned' memory, where a virtual address of a beginning of that piece can be computed by a simple offset to the physical address location of the beginning of that piece of memory that stored the data. Alternatively, a simple fixed formula or pattern or a lookup table may be used for translation. For example, a pattern may be a part of micro-code executed by control logic 131 and/or sequencer 132.

As used herein, a "bit vector" may refer to a physically contiguous number of bits, whether physically contiguous in rows (e.g., horizontally oriented) or columns (e.g., vertically oriented). A PIM capable device may be configured to perform bit vector operations such as logical operations and/or transfer operations on a number of contiguous portions (e.g., "chunks") of virtual address space. For example, a chunk of virtual address space may have a bit length of 256 bits. A chunk may or may not be contiguous sequentially to other chunks in the virtual address space.

MMU controller 134, which may reside on host 111 (as shown in FIG. 1), may be responsible for performing the translation of virtual memory addresses (e.g., addresses associated with the host 111) to physical addresses (e.g., addresses associated with the memory device 120). MMU controller 134 may also perform memory protection operations, cache control, and/or bus arbitration operations.

Timing circuitry 133 may provide timing to coordinate performance of logical operations and may be responsible for providing conflict free access to arrays, such as memory array 130 in FIG. 1. In various embodiments, controller 140 and/or the timing management circuitry 135 may generate status information, which may be transferred to or from host 111, for example via channel bus 157. Channel bus 157 may be independent of (e.g., separate from) a double data rate (DDR) memory interface (e.g., control bus 154) that may be used to transfer (e.g., pass) DDR commands between host 111 and memory device 120. That is, in some embodiments, channel bus 157 may be used to transfer commands to cause performance of bit vector operations from host 111 to memory device 120, while control bus 154 may be used to transfer DRAM commands from host 111 to memory device 120. In some embodiments, the DRAM commands that are transferred via control bus 154 may be commands to control operation of DRAM such as DDR1 SDRAM, DDR2 SDRAM, DDR3 SDRAM, and/or DDR4 SDRAM. In other embodiments, memory device 120 may signal to host 111 about readiness of operations via channel bus 157. In some embodiments, channel bus 157 is combined with control bus 154 and/or data bus 156. Further, in some embodiments, host 111 may include multiple memory devices 120 with multiple channels and/or control buses.

In some embodiments, sequencer 132 may include a very large instruction word (VLIW) type controller configured to operate on logical operation commands and control logic 131 may be configured to issue the logical operation commands to sequencer 132 in response to a signal from a processing resource (e.g., GPU or GPU) (not shown) of host 111. For example, sequencer 132 may be configured to sequence multiple logical operations such that composite operation commands may be issued by sequencer 132. Control logic 131 may, in some embodiments, be configured to generate a VLIW as a bit vector operation command(s). The VLIW may comprise microcode instructions. Sequencer 132 may be, or may include, the VLIW type controller configured to decode the VLIW into a plurality of separate microcode instructions. For example, sequencer 132 may decode the VLIW into instructions to cause performance of composite operations (e.g., ADD, MULTIPLY, etc.). In some embodiments, the composite operation commands may provide an entry point into a sequence of VLIW instructions to cause perform such composite operations. Sequencer 132 may be coupled to memory device 120 and may pass commands to coordinate bit vector operations to memory device 120 via channel bus 157. Microcode instructions may be executable in sequence and/or in parallel by sequencer 132 itself and/or by other components in the memory device 120 (e.g., bit vector operation timing circuitry 139, timing circuitry 133, timing management circuitry 135, and/or sensing circuitry 150).

Memory array 130 may include a DRAM array, SRAM array, STT RAM array, PCRAM array, TRAM array, RRAM array, NAND flash array, and/or NOR flash array, for instance. Memory array 130 may include memory cells arranged in rows coupled by access lines, which may be referred to herein as word lines or select lines, and columns coupled by sense lines, which may be referred to herein as data lines, digit lines, or bit lines. Although a single memory array is shown in FIG. 1, embodiments are not so limited. For instance, memory device 120 may include a number of memory arrays 130 (e.g., a number of banks of DRAM cells, NAND flash cells, etc.).

Memory device 120 includes address circuitry 142 to latch address signals for data provided over a data bus 156 (e.g., a data/address bus) through I/O circuitry 144. Status and/or exception information may be provided from controller 140 on memory device 120 to a channel controller 143, through an interface (e.g., a high speed interface (HSI)) including channel bus 157. Address signals are received through address circuitry 142 and decoded by a row decoder 146 and a column decoder 152 to access memory array 130. Data may be read from memory array 130 by sensing the state of memory cells on the digit lines using sensing circuitry 150. The state of memory cells may be sensed as, for example, voltage and/or current changes, magnetic state changes, resistivity, and quantum state, and so on, depending on the memory cell technology. Sensing circuitry 150 may read and latch a page (e.g., row) of data from memory array 130. I/O circuitry 144 may be used for bi-directional data communication with host 111 over data bus 156. Write circuitry 148 can be used to write data to memory array 130. In some embodiments, write circuitry 148 is combined with sensing circuitry 150. In other embodiments, sensing circuitry 150 may be a part of column decoder 152 and/or row decoder 146. In some embodiments, control bus 154 may serve as both a control and address bus for DRAM control and addressing (e.g., in accordance with a DDR protocol in which control bus 154 operates as a unidirectional data bus). Although shown as separate buses in FIG. 1, in some embodiments, control bus 154 and data bus 156 may not be separate buses.

Controller 140 (e.g., memory controller) may decode signals provided by control bus 154 from host 111. These signals can include chip enable signals, write enable signals, and address latch signals that are used to control DRAM operations performed on memory array 130, including data read, data write, and data erase operations. In various embodiments, controller 140 may be responsible for executing instructions from host 111 and sequencing access to memory array 130. Controller 140 may include a state machine, sequencer, or some other type of controller and include hardware and/or firmware (e.g., microcode instructions) in the form of an application specific integrated circuit (ASIC). In a number of embodiments, controller 140 may include bit vector operation timing circuitry 139. Controller 140 may control, for example, sensing circuitry 150. For example, controller 140 may control generation of clock signals and application of the clock signals to compute components in association with performing bit vector operations.

As shown in FIG. 1, bit vector operation timing circuitry 139 may include timing circuitry 133 and timing management circuitry 135. Timing circuitry 133 may include a FIFO buffer to provide timing coordination with sensing circuitry 150 associated with memory array 130 of memory cells. In some embodiments, timing circuitry 133 may include a state machine, such as an atomic state machine.

Timing management circuitry 135 may be configured to coordinate timing of logical operations (e.g., a sequence of logical operations), associated with the bit vector operation, performed using a row address strobe (RAS)/column address strobe (CAS) component 136 associated with memory array 130. RAS component 136 may be configured to send and/or receive a signal (e.g., RAS/CAS signal) to or from memory array 130 to identify and/or select a row and/or column address of memory array 130. Memory device 120 may, in some embodiments, be configured to execute a DRAM operation such as a memory array access request, which may be issued by host 111 via control bus 154. In some embodiments, timing management circuitry 135 may be configured to execute instructions to control timing of performance of a bit vector operation.

In one or more embodiments, portions of controller 140, (e.g., bit vector operation timing circuitry 139, timing circuitry 133, and/or timing management circuitry 135), may include a reduced instruction set computer (RISC) type controller operating on, for example, 32 and/or 64 bit length instructions. In various embodiments, timing management circuitry 135 may be responsible for executing instructions received from timing circuitry 133 to cause performance of bit vector operations involving data values associated with sensing circuitry 150.

As described further below, in a number of embodiments, sensing circuitry 150 may include a plurality of sensing components, which can each include a sense amplifier and a compute component. The compute component may serve as an accumulator, and sensing circuitry 150 may be used to perform bit vector operations (e.g., on data associated with complementary digit lines). In a number of embodiments, sensing circuitry 150 may be used to perform bit vector operations using data stored in memory array 130 as inputs and/or store the results of the operations back to the memory array 130 without transferring data via a digit line address access (e.g., without firing a column decode signal). For instance, various operations (e.g., bit vector operations) may be performed using, and within, sensing circuitry 150 rather than (or in association with) being performed by processing resources external to sensing circuitry 150 (e.g., by a processing resource associated with host 111 and/or other processing circuitry, such as ALU circuitry, located on memory device 120 (e.g., on controller 140 or elsewhere)). In a number of embodiments, sensing circuitry 150 (e.g., the number of sensing components) may be used to execute bit vector operations in a SIMD (single instruction multiple data) manner with the sensing components serving as 1-bit processing elements on a per column basis. In other embodiments, neighboring sensing components may exchange data bits amongst each other, thus producing computation based on multiple data sources. In other embodiments, sensing components may produce different computation depending on their location within sensing circuitry 150, thus providing computation in VLIW manner. In embodiments in which sensing circuitry 150 executes bit vector operations, sensing circuitry 150 may serve as and/or be referred to as an "in memory processor." As described more fully below, in some embodiments, sensing circuitry 150 may include a sequencer (e.g., similar to sequencer 132).

In various conventional approaches, data associated with an operand, for instance, may be read from memory via sensing circuitry and provided to external ALU circuitry via I/O lines (e.g., via local I/O lines and/or global I/O lines). The external ALU circuitry may include a number of registers and would perform bit vector operations using the operands, and the result may be transferred back to the array via the I/O lines. In other embodiments, sensing circuitry 150 is configured to perform bit vector operations on data stored in memory array 130 and store the result back to the memory array 130 without enabling an I/O line (e.g., a local I/O line) coupled to sensing circuitry 150.

In a number of embodiments, circuitry external to memory array 130 and sensing circuitry 150 may not be needed to perform operations as sensing circuitry 150 may perform the appropriate bit vector operations without the use of an external processing resource. Therefore, sensing circuitry 150 may be used to complement and/or to replace, at least to some extent, such an external processing resource (or at least the bandwidth consumption of such an external processing resource). However, in a number of embodiments, sensing circuitry 150 may be used to perform logical operations (e.g., to execute instructions) in addition to logical operations performed by an external processing resource (e.g., host 111). For instance, host 111 and/or sensing circuitry 150 may be limited to performing only certain logical operations and/or a certain number of logical operations.

Enabling an I/O line can include enabling (e.g., turning on) a transistor having a gate coupled to a decode signal (e.g., a column decode signal) and a source/drain coupled to the I/O line. However, embodiments are not limited to performing logical operations using sensing circuitry (e.g., sensing circuitry 150) without enabling column decode lines of the array. Whether or not local I/O lines are used in association with performing logical operations via sensing circuitry 150, the local I/O line(s) may be enabled in order to transfer a result to a suitable location other than back to the memory array 130 (e.g., to an external register).

Various embodiments of the disclosure relate to fused-multiply-add (FMA) operations, and more specifically to performing processing-in-memory (PIM) FMA operations. According to various embodiments, data, which is to be used in one or more computations, may be loaded (e.g., into a sequencer) and reused across a number of bits (e.g., loaded into a sense amplifier array via a number of bit lines). Stated another way, various embodiments may relate to reusing sequencer logic across a number of bits associated with a number of bit lines. Thus, in comparison to conventional methods and systems, a number of memory loads and memory stores may be reduced, and thus efficiency of a memory device may be increased and/or latency associated with the memory device may be reduced.

For at least these reasons, various embodiments of the present disclosure, as described more fully herein, provide a technical solution to one or more problems that arise from technology that could not reasonably be performed by a person, and various embodiments disclosed herein are rooted in computer technology in order to overcome the problems and/or challenges described above. Further, at least some embodiments disclosed herein may improve computer-related technology by allowing computer performance of a function not previously performable by a computer.

For matrix multiplication, both central processing units (CPUs) and graphics processing units (GPU) may break down input matrices into tiles, and the tiles may be allocated to processor cores. For each tile of an output matrix, tiles of input matrices are fetched exactly once, which achieves O(N) compute intensity (i.e., processing will increase linearly and in direct proportion to the size of the input data set). The size of each tile of the output matrix may be selected to match a capacity of a level L1 cache or registers of a target processor.

For GPUs, tiles are selected such that the tiles form a hierarchy of thread block tiles, warp tiles, and thread tiles. This tile structure creates paths for data movement from global memory to shared memory (i.e., matrix to thread block tile), from shared memory to the register file (i.e., thread block tile to warp tile), and from the register file to the GPU cores for computation (i.e., warp tile to thread tile).

In PIM, other than memory arrays (e.g., DRAM arrays) and one or more registers (e.g., within a sense amplifier (SA) array), there is no memory hierarchy. However, as described more fully herein, according to various embodiments, data may be reused in PIM FMA operations.

Figure 2A:
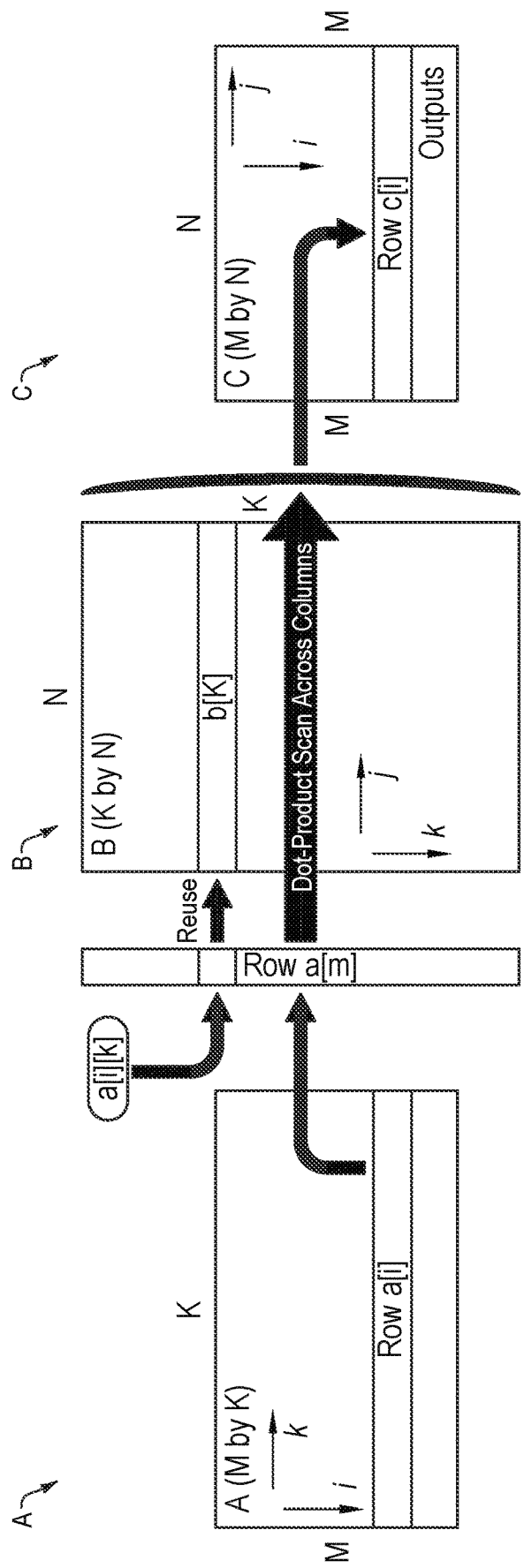
FIG. 2A depicts a number of example matrices.

FIG. 2A illustrates a matrix A including a number of rows M and a number of columns K, and a matrix B including a number of rows K and a number of columns N. FIG. 2A further illustrates a matrix C, which includes M rows and N columns. As described more fully below, data of matrix C may be generated based on operations performed with data of matrix A and data of matrix B.

According to various embodiments, to multiply matrices (e.g., matrix A and matrix B), each row of matrix A (e.g., of a first memory array) may be scanned (e.g., with a dot-product operation) across all columns in matrix B (e.g., of a second memory array) to compute each row in an output matrix C. During the scan (e.g., a dot product scan), each number in an input row of matrix A may be reused across all columns of matrix B. Thus, according to various embodiments, each bit in a row of matrix (e.g., matrix A and/or matrix B) may be read only once by, for example, a PIM vector engine, such as a fused-multiply-add (FMA) unit.

More specifically, according to various embodiments, each element $a\_(i, k)$ of matrix A (e.g., of a first memory array) may be multiplied across a row $b\_(k)$ of matrix B (e.g., of a second memory array), yielding a new temporary row scaled by a single element $a\_(i, k)$. Stated another way, each element $a\_(i, k)$ of matrix A may be loaded into a FMA unit as a common operand along with a row $b\_(k)$ of matrix B that is to be multiplied by the common operand. A result of the multiplication, a scaled row (e.g., scaled row $b'\_(k) = b\_(k)*a\_(i, k)$) may be stored (e.g., in a local register of the FMA unit or in designated part of memory array 130). Further, a different element $a\_(i, k+1)$ of matrix A may be loaded into a FMA unit as a common operand along with a row $b\_(k+1)$ of matrix B that is to be multiplied by the common operand. A result of the multiplication, a scaled row (e.g., scaled row $b'\_(k+1) = b\_(k+1)*a\_(i, k+1)$) may be computed and added (or accumulated) to previously computed row $b'\_(k)$. Stated another way, scaled rows $b'\_(k)$ (e.g., of an intermediate matrix) may be summed along a column and across rows to generate a row $c\_(i)$, which may be stored back into a memory array (e.g., the second memory array) as a complete row of output matrix C. In other words, the rows of the intermediate matrix $b'\_(k)$ can be collapsed and accumulated across rows and along columns to generate an accumulated sum (a row) that may be stored back into a memory array (e.g., the second memory array) (e.g., as row $c\_(i)$). These acts may be repeated for each row of matrix A and/or matrix B to generate the other rows of matrix C.

According to some embodiments, bits from a row (e.g., row $b\_(k)$ of matrix B) may be co-allocated inline along word lines of a memory array in a bit-parallel manner. In other words, each bit of the row (e.g., each bit of row $b\_(k)$ of matrix B) may be loaded (e.g., into a FMA unit) via a set of bit lines of the memory array. Thus, all bits from the row may be accessed simultaneously. Further, as noted above, a number (e.g., bit $a\_(i, k)$ of matrix A) may be applied (e.g., via a sequencer) as a common operand to the entire loaded row (e.g., row $b\_(k)$ of matrix B). In other words, the numbers (e.g., bit $a\_(i, k)$ of matrix A) may be multiplied-accumulated by rows (e.g., rows $b\_(k)$ of matrix B) (e.g., in a memory array on sense amplifier logic). According to various embodiments, a bit-parallel FMA unit may receive the bits from the row (e.g., row $b\_(k)$ of matrix B), wherein the bit-parallel FMA unit may be based on sequencing bits of numbers in the row (e.g., row $b\_(k)$ of matrix B) as prescribed by the bits of a common operand (e.g., bit $a\_(i, k)$ of matrix A). In some embodiments, the operand may include a microcode for controlling a sequencer.

As noted above, in at least some embodiments, accumulation may be performed local to bit lines of a memory array, and thus a multiplication process may not require a substantial amount of hardware. In the example shown in FIG. 2A, a FMA process may require, for example, M×K memory loads (N+1 elements each) and M memory stores (N elements each).

Further, according to some embodiments, matrix B may be split into tiles and matrix B may be replicated (e.g., to increase parallelism). Also, inputs (i.e., an input vector such as a row of matrix A) may be allocated to the tiles, and the inputs may be spread among an FMA array (e.g., a sense amplifier array) (e.g., to increase compute concurrency and decrease communication distance). Moreover, according to some embodiments, partial result accumulation may be performed in logarithmic time (e.g., to reduce communication cost).

Figure 2B:
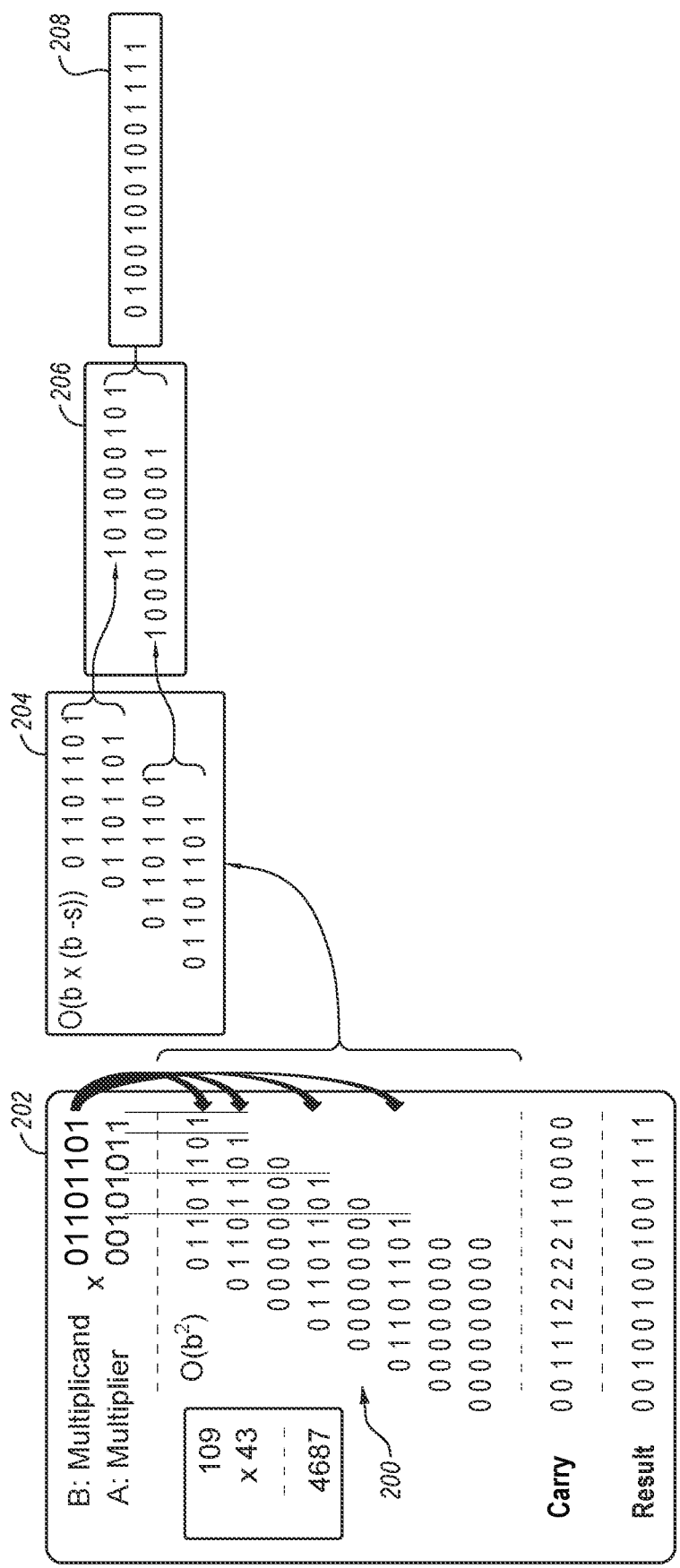
FIG. 2B depicts an example binary multiplication including an accumulation operation.

For example, FIG. 2B depicts an example of binary multiplication including an accumulation operation performed in logarithmic time. As shown in FIG. 2B, non-zero rows of an intermediate matrix 200 in block 202 are used in a first computation step (e.g., in block 204) wherein parallel computations are performed to generate the results shown in block 206. Further, in a second computation step (e.g., in block 206), the results of first computation step are computed into a final result (i.e., shown in block 208). Thus, complexity of the computation is logarithmic (i.e., $\log_w(b-s)$), where w is the width of an FMA unit (i.e., how many operands the FMA unit may receive (e.g., 2 operands in this example), b is the number of bits (e.g., bit width), and s is the number of skips (i.e., zero rows resulting from multiplier bits with value 0 may be skipped)).

According to various embodiments, various operations (e.g., matrix multiplication) may be further parallelized according to one or more of the following options: 1) across rows $a\_(i)$ of matrix A, which may require replication of matrix B; 2) across columns $a\_(k)$ of matrix A, which may require large shared XOR-and-Carry or intermediate storage to a memory device to perform the accumulation; and 3) across tiles in both columns and rows of matrix A, which may impose some intermediate requirements between options 1 and 2. In some of these embodiments, additional communication and/or integration of results (i.e., results generating from splitting matrices across memory arrays) may be required (e.g., depending on where the results are stored). Further, in some embodiments, the results, which may be partial dot-products, may need to be summed together to generate one or more rows in matrix C. Because parallel summation may include a data reduction operation, and may be completed in log time, in some embodiments, communication may occur locally (e.g., on the same chip), and thus fewer higher-level partial results (e.g., from different chips) may be summed together.

As described more fully below, in at least some embodiments, during an FMA operation, an intermediate matrix M may be generated via a shift-replication of a bit in one vector under condition of bits in another vector. For example, with reference to FIG. 3, an example bit vector 'a' (i.e., 1 1 0 1) may be loaded (e.g., into a sequencer of an FMA unit), and an example bit vector 'b' (i.e., 1 0 0 1) may be loaded (e.g., into a sense amplifier of the FMA). Further, as described more fully below, an intermediate matrix M may be generated via a shift-replication of the bit of vector 'b' under condition of the bits in vector 'a'.

More specifically, a first bit of vector 'a', which is a '1', may be multiplied by the bits of vector 'b' to generate the first (i.e., the top) row of matrix M (i.e., 1 0 0 1). Further, a second bit of vector 'a', which is a '0', may be multiplied by the bits of vector 'b' to generate the second row of matrix M (i.e., 0 0 0 0), which is shifted one column space to the left relative to the top row of matrix M. Also, a third bit of vector 'a', which is a '1', may be multiplied by the bits of vector 'b' to generate the third row of matrix M (i.e., 1 0 0 1), which is shifted one column space to the left relative to the second row of matrix M. Further, a fourth bit of vector 'a', which is a "1", may be multiplied by the bits of vector 'b' to generate the fourth (i.e., the bottom) row of matrix M (i.e., 1 0 0 1), which is shifted one column space to the left relative to the third row of matrix M.

According to various embodiments, bits of vector 'a' may be used one at a time. For each bit of vector 'a' (i.e., for each cycle), a value of vector 'b' is read, shifted, and either added to, or not added to, a total (e.g., a running total). For example, during a first cycle, when a=1 (i.e., the first bit of a), "1 0 0 1" is added to a total, during a second cycle, when a=0 (i.e., the second bit of a), "0 0 0 0" is added to the total (i.e., it is skipped), during a third cycle, when a=1 (i.e., the third bit of a), a shifted version of b is added to the total, and during a fourth cycle, when a=1 (i.e., the fourth bit of a), a further shifted version of b is added to the total.

In some embodiments, for example, a sequencer may perform the shift-replication and store intermediate matrix M into a scratchpad area interfacing a memory array (e.g., a memory array that included vector 'b'). In some embodiments, the scratchpad area may be a part of memory array (e.g., a specially designated part of memory array located closely to sense amplifiers (e.g., to reduce digit line RC parasitic for faster data transfer in and out of the scratchpad)). In some embodiments, the scratchpad area may include high-speed memory cells. After matrix M is generated and stored, matrix M may be read back into the memory array. During the read, a sense amplifier may perform an XOR-and-carry operation with local accumulation. For example, an XOR-and-carry operation with local accumulation may be performed based on ripple carry adder, which may include minimal logic (e.g., 65 gate delays for 32b adder). This operation may essentially collapse matrix M into a multiplication result R. Stated another way, the columns of matrix M may be summed to produce R (i.e., 1 1 1 0 1 0 1), which, in this example, is row $c\_(i)$, as shown in FIG. 2A. Row $C_{in}$ shown in FIG. 3 may be indicative of a carry operation associated with summing the columns of matrix M.

Figure 4:
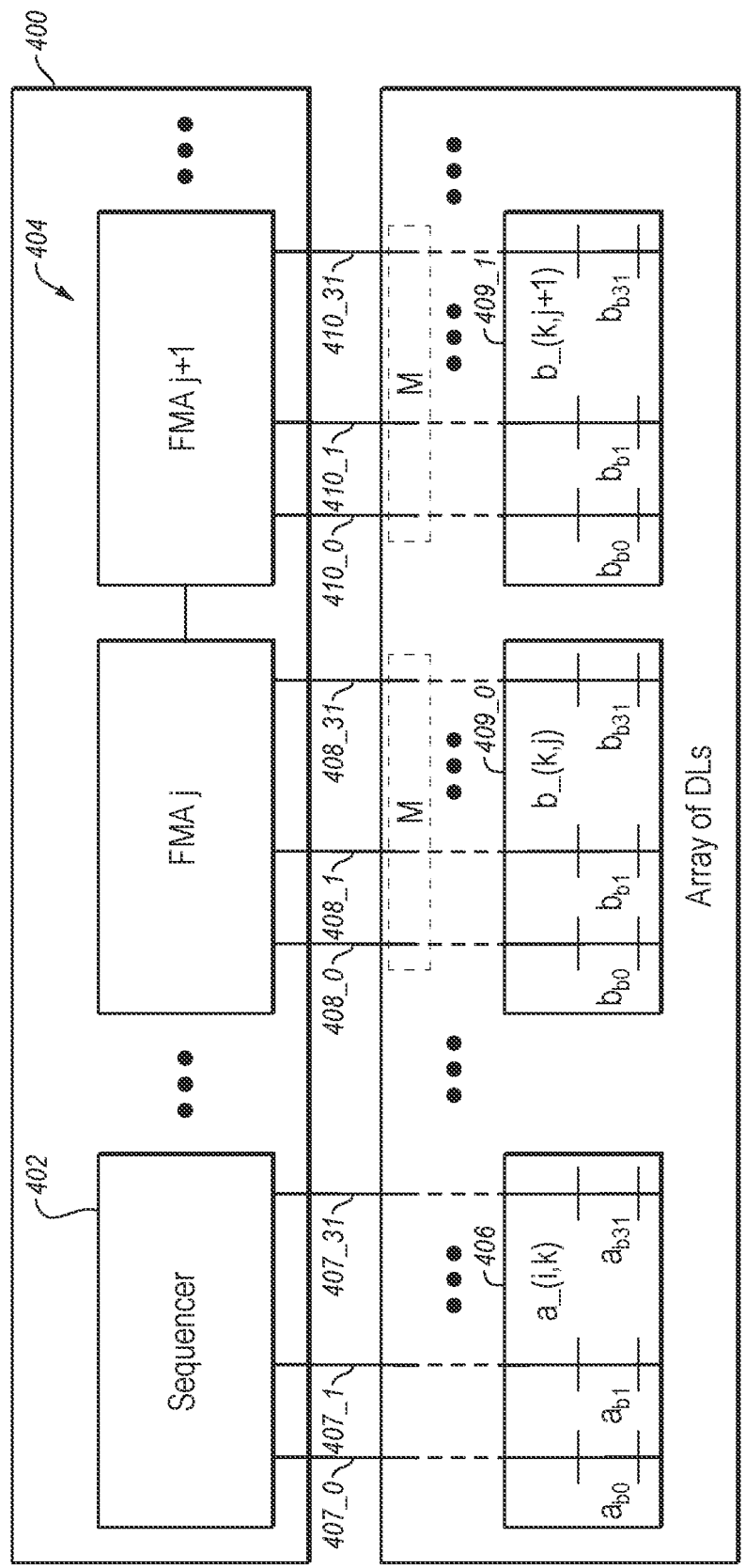
FIG. 4 illustrates a fused-multiply-add unit including a sequencer and a sense amplifier array, in accordance with one or more embodiments of the present disclosure.

FIG. 4 depicts an FMA unit 400, according to various embodiments of the present disclosure. FMA unit 400, which may also be referred to herein as a "bit-parallel FMA unit," includes a sequencer 402 and an array 404, which may include a sense amplifier array (e.g., within sensing circuitry 150 of FIG. 1). Array 404 may include a number of local FMA modules (e.g., FMA j FMA j+1, and so on). FIG. 4 further illustrates intermediate matrices M, wherein each intermediate matrix M is associated with a FMA module.

According to some embodiments, sequencer 402 may be local to a memory device (e.g., memory device 120 of FIG. 1), and more specifically, in some embodiments sequencer 402 may be part of, or proximate to, sensing circuitry (e.g., sensing circuitry 150 of FIG. 1). In these embodiments, sequencer 402 may be configured to receive data from a memory array 406 (e.g., via an array of bit lines 407). In other embodiments, sequencer 402 may be external to a memory device. For example, sequencer 132 of FIG. 1 may include sequencer 402. In these embodiments, sequencer 402 may be configured to drive one or more memory arrays (e.g., at the same time or different times). Further, in either embodiment, sequencer 402 may be configured to receive data and/or control signals from control logic, which may be part of, or external to, a memory device (e.g., an external processor). Although FMA unit 400 is depicted as including sequencer 402, the disclosure is not so limited, and, in some embodiments, sequencer 402 may be external to FMA unit 400. In other embodiments, a number of sequencers 402 can be distributed amongst FMA units 400.

FMA unit 400 may be configured to receive data via an array of bit lines 408/410 (also referred to herein as data lines (DLs)). More specifically, data from matrix A (see FIG. 2A) may be loaded into sequencer 402 (via bit lines 407), and data from matrix B (see FIG. 2A) may be loaded into array 404 (via bit lines 408/410). Yet more specifically, one or more bits from a row of matrix A may be loaded into sequencer 402, and a row of matrix B (e.g., a number of groups of bits), which may be split into a number portions (e.g., tiles) 409_0, 409_1, etc., may be loaded into array 404, wherein each portion of the row of matrix B (e.g., 32 bits of the row) may be loaded into a local FMA module (e.g., FMA j FMA j+1, and so on) of array 404. More specifically, a first portion (also referred to herein as a "group") (e.g., a 32 bit value) of the row of matrix B may be loaded into FMA j of array 404, and a second portion (e.g., a 32 bit value) of the row of matrix B may be loaded into FMA j+1 of array 404, and so on, such that the entire row of matrix B is loaded into array 404. Although FMA unit 400 is depicted as including sequencer 402, the disclosure is not so limited, and, in some embodiments, sequencer 402 may be external to FMA unit 400.

With reference to FIGS. 2A, 4, 5A, and 5B, a contemplated operation of FMA unit 400 will be described. According to some embodiments, during a first cycle, a first group of bits of a first row (e.g., a 32 bit value) (also referred to herein as an "input bit vector" or a "multiplier operand") of an input matrix (e.g., matrix A) may be loaded into sequencer 402, and at least a portion of a first row (e.g., including a number of groups of bits "multiplicand operands") of another matrix (e.g., matrix B) may be loaded into array 404. More specifically, in some embodiments, for example, each 32 bit value of the first row may be loaded into each respective local FMA module of array 404. In other embodiments, as described more fully below, individual bits may be loaded into sequencer 402 in a sequential manner.

Continuing with this example, a first bit of the input bit vector in sequencer 402 may be multiplied by each bit of the row (e.g., including a number of groups of bits) loaded in array 404 to generate a scaled row b'(1) (see FIG. 5A). Subsequently, during a second cycle, a second bit of the input bit vector in sequencer 402 may be multiplied by each bit of the row in array 404 to generate another scaled row b'(2). According to various embodiments, scaled row b'(2) may be shifted one column position (e.g., to the left in an intermediate matrix) relative to scaled row b'(1). Further, during a third cycle, a third bit of the input bit vector in sequencer 402 may be multiplied by each bit of the row in array 404 to generate another scaled row b'(3). According to various embodiments, scaled row b'(3) may be shifted one column position (e.g., to the left in an intermediate matrix) relative to scaled row b'(2).

This process may continue until the last bit of the input bit vector in sequencer 402 is multiplied by the row of matrix B loaded into array 404. In other words, this process may continue until a last bit of the input bit vector in sequencer 402 may be multiplied by each bit of the row loaded in array 404 to generate a last scaled row b'(i).

Further, all the values of scaled rows b' in a column (i.e., along a digit line) may be accumulated (e.g., an accumulator (e.g., a digital accumulator) may maintain a running value along the digit lines) to generate row c[i] of matrix C. More specifically, all values of $b_{b0}$ are summed to generate a first bit in row c[i], all values of $b_{b1}$ are summed to generate a second bit in row c[i], all values of $b_{b2}$ (not shown in FIG. 4) are summed to generate a third bit in row c[i], and so on (e.g., all values of $b_{b31}$ are summed to generate a 32nd bit in row c[i]) to generate row c[i]. In addition, with each sum, a carry value may be generated and propagated from least significant bit to most significant bit (e.g., if the least significant bit is $b_{b0}$, then the carry value generated as a result of values of $b_{b0}$ summed to generate a first bit in row c[i], propagated to the values of $b_{b1}$ and used in summing values of $b_{b1}$ to generate a second bit in row c[i] and its carry value and so on until the $32^{nd}$ bit in row c[i]). As will be appreciated, row c[i] includes the dot product of one row of matrix A and all columns of matrix B after multiplying and accumulating all group of bits of a first row of an input matrix (e.g., matrix A) in the manner described herein. In other words, the first group of bits in row c[i] (e.g., a 32 bit value) is the dot product of a first row of matrix A and the first column of matrix B, the second group of bits in row c[i] of matrix C is the dot product of the first row of matrix A and the second column of matrix B, and so on.

Continuing with this example, a second group of bits of a first row (e.g., a 32 bit value) (also referred to herein as an "input bit vector" or a "multiplier operand") of the input matrix (i.e., matrix A) may be loaded into sequencer 402, and a second row (e.g., including a number of groups of bits "multiplicand operands") of matrix B may be loaded into array 404. Further, a first bit of the input bit vector in sequencer 402 may be multiplied by each bit of the row loaded in array 404 to generate a scaled row b"(1) (see FIG. 5B). Subsequently, a second bit of the input bit vector in sequencer 402 may be multiplied by each bit of the row in array 404 to generate another scaled row b"(2). According to various embodiments, scaled row b"(2) may be shifted one column position (e.g., to the left in an intermediate matrix) relative to scaled row b"(1). Further, a third bit of the input bit vector in sequencer 402 may be multiplied by each bit of the row in array 404 to generate another scaled row b"(3). According to various embodiments, scaled row b"(3) may be shifted one column position (e.g., to the left in an intermediate matrix) relative to scaled row b"(2).

This process may continue until the last bit of the input bit vector in sequencer 402 is multiplied by the row of matrix B loaded into array 404. In other words, this process may continue until a last bit of the input bit vector in sequencer 402 may be multiplied by each bit of the row loaded in array 404 to generate a last scaled row b"(i).

Further, all the values of scaled rows b" in a column (i.e., along a digit line) may be accumulated (e.g., an accumulator may maintain a running value along the digit lines) to generate row c[i] of matrix C. More specifically, all values of $b_{b0}$ are summed to accumulate to a first bit in row c[i] which was previously instantiated in the manner described above, all values of $b_{b1}$ are summed to accumulate to a second bit in row c[i], all values of $b_{b2}$ (not shown in FIG. 4) are summed to accumulate to a third bit in row c[i], and so on (e.g., all values of $b_{b31}$ are summed to accumulate to a 32nd bit in row c[i]) to continue generating row c[i]. In addition, with each sum, a carry value may be generated and propagated from least significant bit to most significant bit (e.g., if the least significant bit is $b_{b0}$, then carry value generated as a result of values of $b_{b0}$ accumulated to a first bit in row c[i], propagated to the values of $b_{b1}$ and used in accumulating values of $b_{b1}$ to a second bit in row c[i] and its carry value and so on until the $32^{nd}$ bit in row c[i]). As will be appreciated, row c[i] includes the dot product of one row of matrix A and all columns of matrix B after multiplying and accumulating all group of bits of a first row of an input matrix (e.g., matrix A) in the manner described herein. In other words, the first group of bits in row c[i] (e.g., a 32 bit value) is the dot product of a first row of matrix A and the first column of matrix B, the second group of bits in row c[i] of matrix C is the dot product of the first row of matrix A and the second column of matrix B, and so on. The process described above with reference to FIGS. 2, 4, 5A, and 5B may be repeated for all the other rows of matrix A and matrix B to generate bits for all rows of matrix C.

In some embodiments, generation of an entire scaled matrix (i.e., a scaled version of matrix B) may not be required. More specifically, when an intermediate matrix (e.g., intermediate matrix M comprised of rows b'(1), b'(2), etc.) is read and collapsed, the result may be accumulated and summed with the next intermediate matrix (i.e., the intermediate matrix produced for the next in sequence a_(i, k+1) multiplied by the rows b_(k+1)). Further, in some embodiments, it may not be necessary to generate and store an intermediate matrix. Rather, in these embodiments, a computation in-place operation may be used inside FMA modules, such that the rows of intermediate matrix are immediately accumulated. Further, according to some embodiments, shift-replication with XOR-and-carry may be performed (e.g., in real-time) within an array (e.g., via 32 shifts and serial XOR-and-carry with each shift).

It is noted that, according to some embodiments, rather than loading an entire group of bits of a row of bits of an input matrix (i.e., matrix A) into sequencer 402, bits of each multiplier operand may be loaded into sequencer 402 sequentially (e.g., a bit is loaded on an as needed basis). More specifically, in some embodiments, a single bit (e.g., a first bit of the operand) may be loaded into sequencer 402, and the single bit may be multiplied by the row loaded into array 404. Further, during or after the multiplication, another bit (e.g., a second bit of the operand) may be loaded into sequencer 402. More specifically, for example, upon completion of an operation (e.g., multiplication) using the first bit of the operand, a second bit of the operand may be loaded (e.g., replacing the first operand) and may be available for use by sequencer 402 for a subsequent operation. Similarly, for example, upon completion of the operation (e.g., multiplication) using the second bit of the operand, a third of the operand may be loaded (e.g., replacing the second bit of the operand) and may be available for use by sequencer 402 for another operation. Loading bits or operands sequentially into sequencer 402 may reduce required die space without sacrificing performance.

As a non-limiting example, a single operation (i.e., multiply-accumulate a_(i, k) by a row b_(k), wherein an intermediate matrix is generated, stored, and read back) may include the following latency (in nanoseconds): 10+10 (i.e., to read numbers a_(i, k) and b_(k) simultaneously)+32×10 (i.e., to generate and store matrix M). Further, to read-back and collapse-accumulate (including a ripple carry computation) matrix M and a previously accumulated result may include the following latency: 10 (i.e., to read-back previously accumulated result)+10 (i.e., to read-back 1st row of matrix M)+65 (i.e., to collapse-accumulate 1st row of matrix M with accumulated result on a ripple carry adder)+65×31 (i.e., to collapse-accumulate other rows of matrix M with accumulated result on a ripple carry adder)+10 (i.e., to store new accumulated result). In this example, the latency is equal to 2,450 nanoseconds. This example assumes 32 bit numbers, memory timings TRCD (i.e., row address to column address delay) and TRP (i.e., row pre-charge time) equal to 10 ns, a 1ns gate delay, and 65 gate delays for 32b ripple-carry adder. It is noted that these latency values are provided as references, and values may vary (e.g., be changed, scaled, optimized).

Using the same assumptions, in another non-limiting example (i.e., multiply-accumulate a_(i, k) by a row b_(k), wherein an intermediate matrix is not generated), a single operation may include the following latency (in nanoseconds): 10+10 (i.e., to read numbers a_(i, k) and b_(k) simultaneously)+10 (i.e., to read-back previously accumulated result)+65×32 (i.e., to collapse-accumulate in-place by shift-replication with XOR-and-carry on a ripple carry adder)+10 (i.e., to store new accumulated result). In this example, the latency is equal to 2,120 nanoseconds. It is noted that these latency values are provided as references, and values may vary (e.g., be changed, scaled, optimized).

Figure 6:
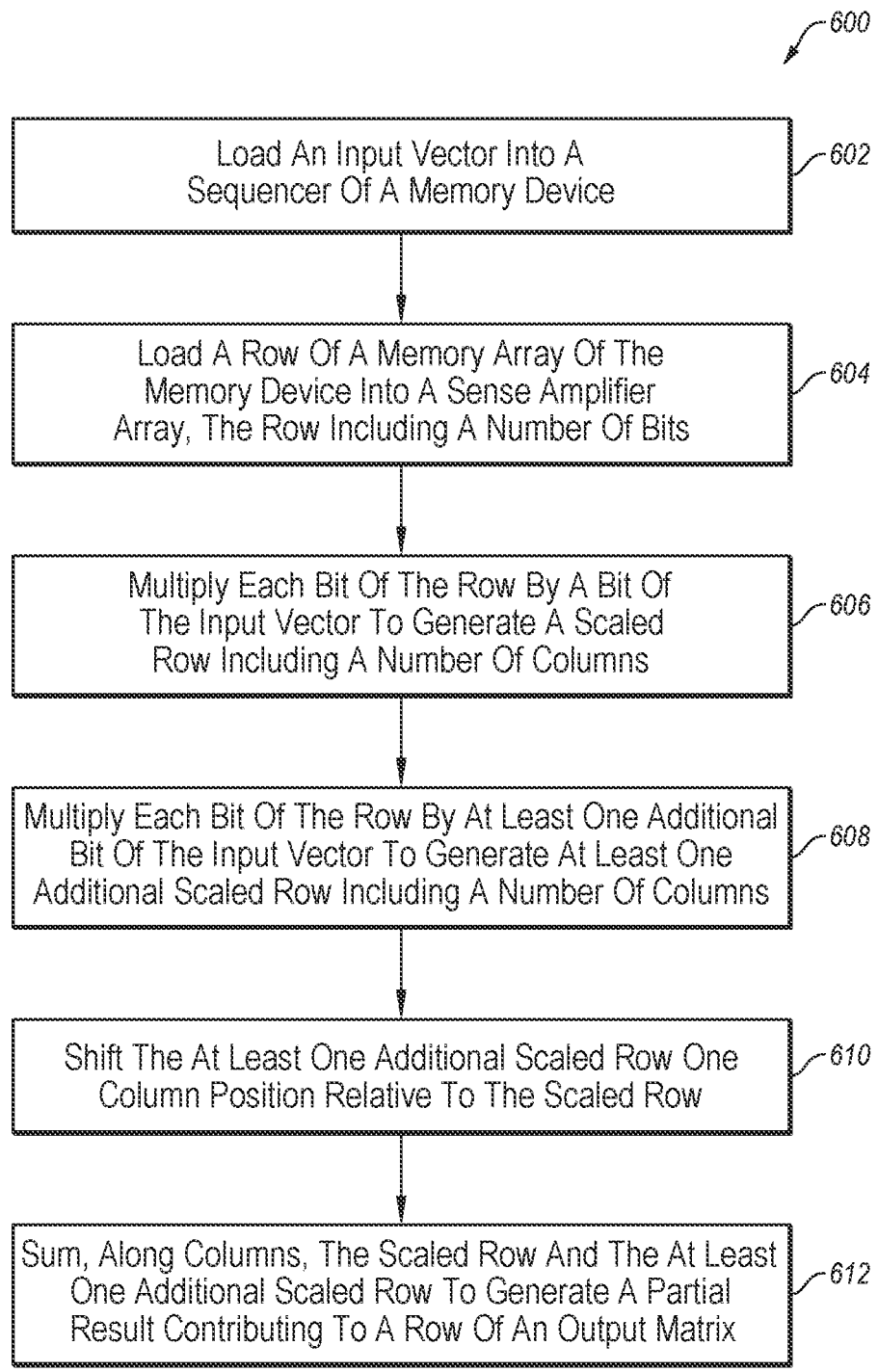
FIG. 6 is a flowchart of an example method of operating a memory system, in accordance with various embodiments of the present disclosure.

FIG. 6 is a flowchart of an example method 600 of operating a memory system, in accordance with various embodiments of the disclosure. Method 600 may be arranged in accordance with at least one embodiment described in the present disclosure. Method 600 may be performed, in some embodiments, by a device or system, such as system 100 of FIG. 1 FMA unit 400 of FIG. 4, memory system 700 of FIG. 7, and/or electronic system 800 of FIG. 8, or another device or system. Although illustrated as discrete blocks, various blocks may be divided into additional blocks, combined into fewer blocks, or eliminated, depending on the desired implementation. It is noted that various blocks may run concurrently with other blocks and/or some blocks may operate in pipeline manner.

Method 600 may begin at block 602, where an input vector may be loaded into a sequencer, and method 600 may proceed to block 604. For example, the input vector, which may include one or more bits, may be loaded into a sequencer that is within a memory device (e.g., within or proximate to sensing circuitry), or external to a memory device (e.g., within an external controller). More specifically, for example, the input vector, which may include one or more bits of a row of an input matrix (e.g., matrix A of FIG. 2A), may be loaded into sequencer 402 of FIG. 4 via one or more bit lines 407.

At block 604, a row of a memory array of a memory device may be loaded into a sense amplifier array of the memory device, and method 600 may proceed to block 606. For example, the row, which may include a number of bits (e.g., a number of groups of bits), may be loaded into one or more FMA modules (e.g., FMA j, FMA j+1, etc.) of FIG. 4. Further, for example, each bit of the row may be loaded via a dedicated bit line (e.g., bit lines 408/410 of FIG. 4).

At block 606, each group of bits of the row may be multiplied by a bit of the input vector to generate a scaled row including a number of columns, and method 600 may proceed to block 608. For example, a bit of the input vector, which may be shared across the sense amplifier array (e.g., array 404 of FIG. 4), may be multiplied by each bit of the row loaded in the sense amplifier array to generate the scaled row. For example, the scaled row may include scaled row b'(1) illustrated in FIG. 5A.

At block 608, each group of bits of the row may be multiplied by at least one additional bit of the input vector to generate at least one additional scaled row including a number of columns, and method 600 may proceed to block 610. For example, a second bit of the input vector, which may be shared across the sense amplifier array (e.g., array 404 of FIG. 4), may be multiplied by each bit of the row loaded in the sense amplifier array to generate a second scaled row. Further, for example, a third bit of the input vector, which may be shared across the sense amplifier array (e.g., array 404 of FIG. 4), may be multiplied by each bit of the row loaded in the sense amplifier array to generate a third scaled row. For example, the second scaled row may include scaled row b'(2) illustrated in FIG. 5A, and the third scaled row may include scaled row b'(3) illustrated in FIG. 5A.

At block 610, the at least one additional scaled row may be shifted one column position relative to the scaled row, and method 600 may proceed to block 612. For example, FIG. 5A illustrates each scaled row shifted one column position relative to an adjacent row. For example, during or after an FMA operation performed by an FMA unit (e.g., FMA array 404 of FIG. 4) to generate a scaled row, the FMA unit may shift the scaled row (e.g., one column position to the left) relative to a previously generated scaled row.

At block 612, the scaled row and the at least one additional scaled row may be summed along columns to generate a partial result contributing to a row of an output matrix. For example, an FMA unit (e.g., FMA array 404 of FIG. 4) may sum the columns (e.g., of an intermediate matrix) of the scaled row and the at least one additional scaled row (e.g., rows b'(1), rows b'(2), rows b'(3), and rows b'(i); see FIG. 5A) to generate a partial result contributing to the row of the output matrix (e.g., row c[i] of matrix C of FIG. 2A). Generating an entire row of the output matrix may include multiple iterations of this process for each bit of each multiplier operand and relevant row of memory array.

Modifications, additions, or omissions may be made to method 600 without departing from the scope of the present disclosure. For example, the operations of method 600 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment. For example, in various embodiments, another input vector may be loaded into the sequencer and/or another row may be loaded into the sense amplifier array. Further, in some embodiments, an intermediate matrix (e.g., intermediate matrix M of FIG. 3) may be generated and/or stored (e.g., in a scratchpad area interfacing the sense amplifier array).

Figure 7:
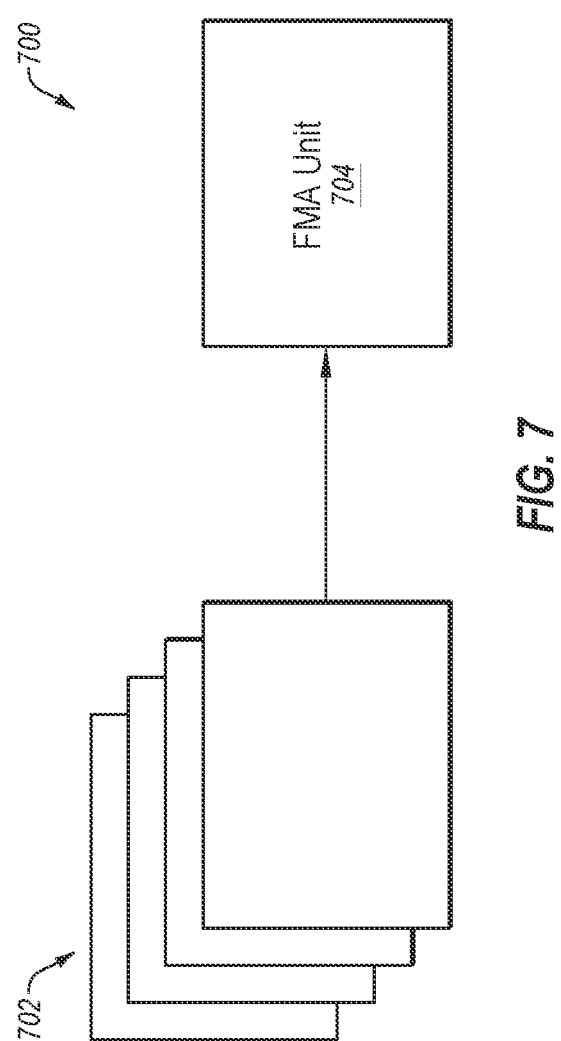
FIG. 7 is a simplified block diagram of an example memory system implemented according to one or more embodiments described herein.

A memory system is also disclosed. According to various embodiments, the memory system may include a memory device (e.g., memory device 120 of FIG. 1) including one or more memory cell arrays. FIG. 7 is a simplified block diagram of a memory system 700 implemented according to one or more embodiments described herein. Memory system 700, which may include, for example, a semiconductor device, includes a memory array 702 and FMA unit 704, which may include array 404 of FIG. 4. Memory array 702, which may include a number of memory banks, may include a number of memory cells.

FMA unit 704 may be operatively coupled with memory array 702 so as to read or write any or all memory cells within memory array 702. FMA unit 704 may be configured for carrying out one or more embodiments disclosed herein. For example, in some embodiments, FMA unit 704, which may include a sequencer and a sense amplifier array, may be configured to performing one or more FMA operations, in accordance with various embodiments disclosed herein.

A system is also disclosed. According to various embodiments, the system may include a memory device including a number of memory banks, each memory bank having an array of memory cells. Each memory cell may include an access transistor and a storage element operably coupled with the access transistor.

Figure 8:
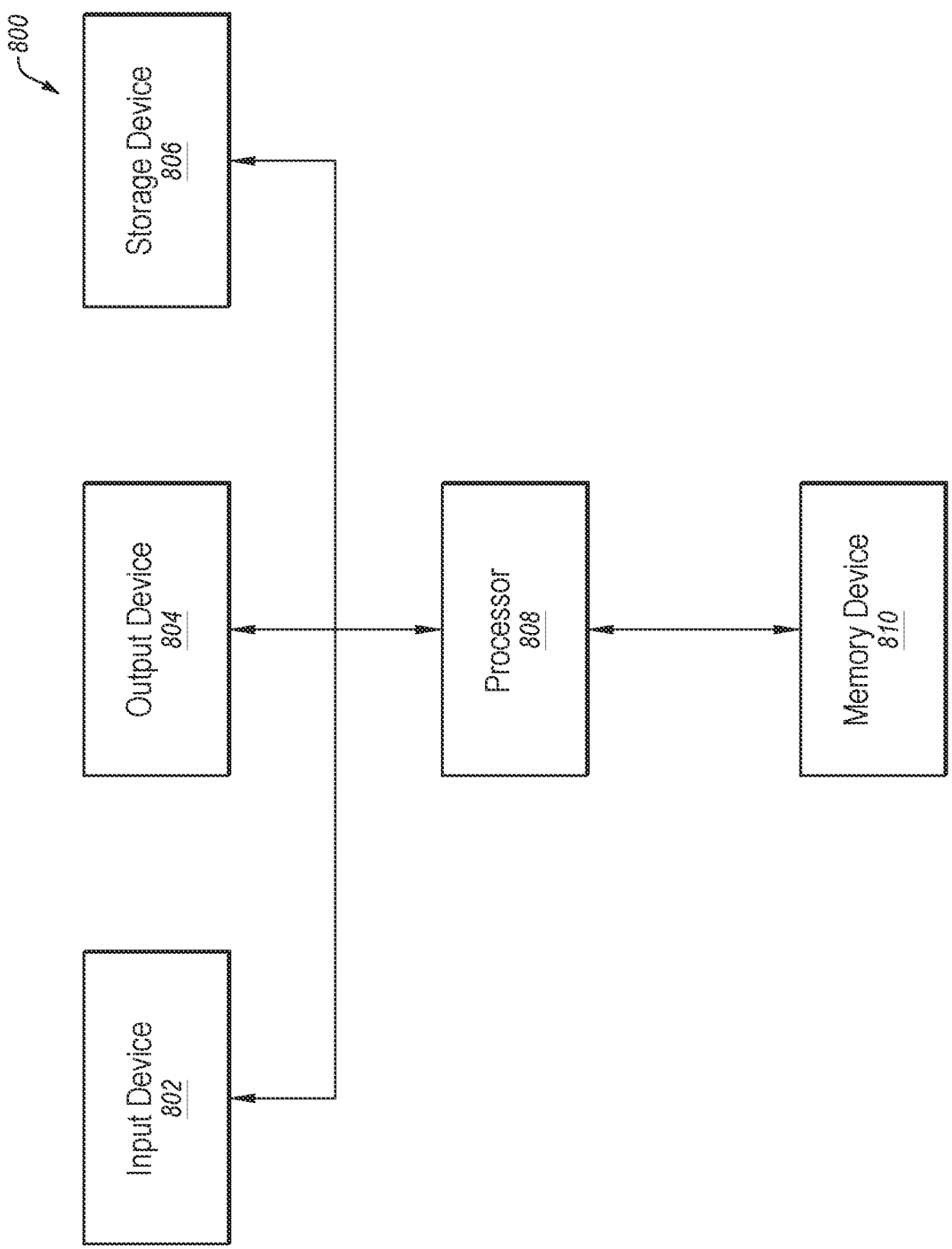
FIG. 8 is a simplified block diagram of an example electronic system implemented according to one or more embodiments described herein.

FIG. 8 is a simplified block diagram of an electronic system 800 implemented according to one or more embodiments described herein. Electronic system 800 includes at least one input device 802, which may include, for example, a keyboard, a mouse, or a touch screen. Electronic system 800 further includes at least one output device 804, such as a monitor, a touch screen, or a speaker. Input device 802 and output device 804 are not necessarily separable from one another. Electronic system 800 further includes a storage device 806. Input device 802, output device 804, and storage device 806 may be coupled to a processor 808. Electronic system 800 further includes a memory device 810 coupled to processor 808. Memory device 810, which may include memory system 700 of FIG. 7, may include an array of memory cells. Electronic system 800 may include, for example, a computing, processing, industrial, or consumer product. For example, without limitation, electronic system 800 may include a personal computer or computer hardware component, a server or other networking hardware component, a database engine, an intrusion prevention system, a handheld device, a tablet computer, an electronic notebook, a camera, a phone, a music player, a wireless device, a display, a chip set, a game, a vehicle, or other known systems.

According to various embodiments disclosed herein, and in contrast to some conventional devices, systems, and methods, data used in one or more computations may be reused (e.g., across bits in a row of a matrix). As a result, a number of reads from and/or writes to one or more memory arrays may be reduced, which may improve efficiency and/or speed of PIM operations and/or reduce latency associated with PIM operations.

One or more embodiments of the present disclosure include a method of operating a memory system. For example, a method may include loading a first number of bits into circuitry of a memory device, each bit of the first number of bits having a first state or a second state. The method may also include loading a second number of groups of bits into the circuitry, each bit of the second number of groups of bits having the first state or the second state. Further, the method may include multiplying each group of bits of the second number of groups of bits by each bit of the first number of bits to generate a number of scaled rows. Further, the method may include summing, along associated bit positions, the number of scaled rows to generate an output row.

According to another embodiment, a method of operating a memory system including a memory device may include loading, via a number of bit lines of a memory array of a memory device, a first number of bit groups of a memory array into circuitry. The method may also include loading a number of operands into the circuitry. Further, the method may include multiplying each bit of each bit group of the first number of bit groups by a first bit of the operand to generate a first scaled row. Also, the method may include generating a number of bits of a row of an output matrix based at least partially on the first scaled row.

In yet another embodiment, a method may include loading, via a number of bit lines of a memory array of a memory device, a group of rows of a memory array into circuitry. The method may further include loading a group of operands into the circuitry. The method may also include multiplying-accumulating each row of the group of rows by each associated operand of the group of operands to generate a first row of an output matrix.

Some embodiments of the present disclosure include a memory system. The memory system may include at least one memory array and logic coupled to the at least one memory array. The logic may be configured to receive an input including a number of bits. The logic may also be configured to receive a row of a memory array of the at least one memory array, the row comprising groups of bits. Further, the logic may be configured to multiply each bit of each group of bits of the groups of bits by each bit of the input to generate a number of groups of scaled rows, wherein each scaled row of each group of scaled rows of the groups of scaled rows including a number of columns and each scaled row of each group of scaled rows of the groups of scaled rows shifted at least one column position relative to an adjacent scaled row within an associated group of scaled rows. Further, the logic may be configured to sum scaled rows across columns within each group of scaled rows to generate an output row.

Additional embodiments of the present disclosure include an electronic system. The electronic system may include at least one input device, at least one output device, and at least one processor device operably coupled to the input device and the output device. The electronic system may also include at least one memory device operably coupled to the at least one processor device. The at least one memory device may include at least one memory cell array and logic coupled to at least one memory array. The logic may be configured to receive a first operand and a row of a memory array of the at least one memory array. The logic may also be configured to multiply-shift-accumulate a number of bits of the row of the memory array by the bits of operand to generate a first scaled row. The logic may also be configured to receive at least one additional operand. Further, the logic may be configured to multiply-shift-accumulate the number of bits of the row by bits of the at least one additional operand to generate at least one additional scaled row. Also, the logic may be configured to generate a row of an output matrix based on the first scaled row and at least one additional scaled row.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

As used herein, the term "device" or "memory device" may include a device with memory, but is not limited to a device with only memory. For example, a device or a memory device may include memory, a processor, and/or other components or functions. For example, a device or memory device may include a system on a chip (SOC). In some embodiments, the computation methods described herein may be applicable to storage device, such as solid-state drives. Therefore, the term "memory device" used herein may include a storage device.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. As used herein, "and/or" includes any and all combinations of one or more of the associated listed items.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternative useful combinations of the elements described, will become apparent to those skilled in the art from the description. Such modifications and embodiments also fall within the scope of the appended claims and equivalents.

What is claimed is:

1. A system, comprising:
  logic configured to:
    multiply each bit of a number of bits from an array by a first bit of an input vector from a sequencer to generate a first row of bits;
    multiply each bit of the number of bits by one or more additional bits of the input vector to generate one or more additional rows of bits; and generate an output row of bits based on at least the first row of bits and the one or more additional rows of bits.

2. The system of claim 1, the logic comprising one or more fused-multiply-add (FMA) units to generate the one or more additional rows of bits.

3. The system of claim 1, the logic comprising:
the sequencer configured to receive the input vector; and
a sense amplifier configured to receive the number of bits in a bit-parallel manner.

4. The system of claim 1, wherein the logic is further configured to:
multiply each bit of a second number of bits from the array by a first bit of a second input vector from the sequencer to generate a third row of bits;
multiply each bit of the second number of bits by one or more additional bits of the second input vector to generate at least one additional row of bits;
generate an additional output row of bits based on at least the third row of bits and the at least one additional row of bits; and
sum, along columns, the output row and the additional output row to generate a row of an output matrix.

5. The system of claim 1, further comprising a memory device including the logic, wherein the memory device includes the sequencer.

6. The system of claim 1, further comprising a memory device including the logic, wherein the sequencer is external to the memory device.

7. The system of claim 1, wherein the logic comprises a number of groups of sense amplifiers, each group of sense amplifiers of the number of groups of sense amplifiers configured to receive a tile associated with a portion of the number of bits.

8. The system of claim 1, wherein the logic is configured to sum, along associated bit positions, the first row of bits and the one or more additional rows of bits.

9. The system of claim 1, further comprising:
at least one input device;
at least one output device;
at least one processor device coupled to the input device and the output device; and
at least one memory device coupled to the at least one processor device and comprising the logic.

10. A method, comprising:
multiplying each bit of a number of bits from an array by a first bit of an operand from a sequencer to generate a first row of bits;
multiplying each bit of the number of bits by one or more additional bits of the operand to generate one or more additional rows of bits; and
generating an output row based on at least the first row of bits and the one or more additional rows of bits.

11. The method of claim 10, further comprising:
multiplying each bit of a second number of bits from the array by a second bit of the operand to generate a third row of bits;
multiplying each bit of the second number of bits by at least one additional bit of the operand to generate at least one additional row of bits; and
generating another output row based on at least the third row of bits and the at least one additional rows of bits.

12. The method of claim 10, further comprising loading a plurality of bits of the operand from a second array into the sequencer.

13. The method of claim 10, further comprising loading the number of bits from the array into a second array.

14. A memory system, comprising:
at least one memory array; and
logic coupled to the at least one memory array and configured to:
multiply each bit of a group of bits by each bit of an input to generate a number of rows, each row of the number of rows including a number of columns and each row of each of the number of rows shifted at least one column position relative to an adjacent row within the number of rows; and
generate an output row based on the number of rows.

15. The memory system of claim 14, wherein the logic is configured to sum bits across columns within the number of rows to generate the output row.

16. The memory system of claim 14, the logic further configured to:
multiply each bit of a second group of bits by each bit of the input to generate a number of additional rows, each row of the number of additional rows including a number of additional columns and each row of each of the number of additional rows shifted at least one column position relative to an adjacent row within the number of additional rows; and
generate an additional output row based on the number of additional rows.

17. The memory system of claim 16, wherein the logic is configured to sum bits across columns within the number of additional rows to generate the additional output row.

18. The memory system of claim 14, the logic further configured to receive the group of bits from a memory array of the at least one memory array, wherein each bit of the group of bits is received at the logic substantially simultaneously.

19. The memory system of claim 14, wherein the logic comprises a sequencer including the input.

20. The memory system of claim 14, wherein the logic comprises a sense amplifier configured to receive the group of bits in a bit-parallel manner.

* * * * *